United States Patent Office 3,471,591
Patented Oct. 7, 1969

3,471,591
POLYMERIZATION PROCESS FOR FORMULATING TERPOLYMERS FROM A CONJUGATED DIENE, AN α,β - UNSATURATED MONOCARBOXYLIC ACID AND A LOWER ALKYL ESTER OF AN α,β-UNSATURATED MONOCARBOXYLIC ACID
Roland G. Lindsey, Springfield, Pa., assignor to E. I. du Pont de Nemours and Company, Wilmington, Del., a corporation of Delaware
No Drawing. Filed Oct. 1, 1965, Ser. No. 492,303
Int. Cl. C08f 15/40; C09f 1/16, 1/04
U.S. Cl. 260—879
11 Claims

ABSTRACT OF THE DISCLOSURE

A two-stage process is provided for formulating a terpolymer by polymerizing a conjugated diene, a $C_3$-$C_9$ α,β-unsaturated monocarboxylic acid, and a lower alkyl ester of a $C_3$-$C_9$ α,β-unsaturated carboxylic acid in which the relative portions of the respective monomers is so adjusted as to provide a first-stage charge rich in diene monomer, and a second-stage charge lean in diene monomer. The resultant terpolymers are useful in formulating easily removable floor polish compositions.

---

This invention concerns a polymerization process and more particularly a process for formulating a terpolymer useful in floor polish compositions.

Polymeric materials are well known as useful ingredients in floor polish compositions. These materials when combined with other polish ingredients such as leveling resins and waxes have been found to yield floor polishes that dry to a bright luster without buffing. While polystyrene and various acrylic polymers have been widely employed in "dry-bright" polish compositions their use is generally accompanied by many disadvantages such as susceptibility to heel and pock marks and a tendency to yellow. However, there has been developed a "dry-bright" floor polish composition with significant improvement in the above recited characteristics. This composition is set forth in United States Patent application Ser. No. 407,871, filed Oct. 30, 1964, now U.S. Patent 3,406,133, and contains, as a polymeric material, an interpolymer formed from monomeric units of (a) a conjugated diene, (b) a monocarboxylic acid, and (c) a monocarboxylic acid ester. The floor polish composition is formulated by combining this interpolymer with the usual polish ingredients. Using this particular polish composition a hard, non-yellowing high gloss film with excellent mar and scuff resistant properties can be obtained.

There is, however, an additional characteristic desired in floor polishes, namely, easy removability. While many presently available floor polish compositions can be removed, their removal usually requires harsh procedures such as the application of a strong ammonia solution or scrubbing with steel wool. The detrimental effects of such procedures on floors themselves and/or the person applying them are well known. The advantage of a floor polish easily removable with common cleansing solutions can be readily appreciated.

According to the present invention there is provided a process for formulating an interpolymer (I) formed from a mixture of the following monomers: (a) 11–30 weight percent conjugated diene represented by the structural formula

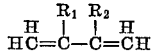

wherein $R_1$ and $R_2$ are hydrogen, chlorine, fluorine or lower alkyl groups and may be the same or different, (b) 3–7 weight percent $C_3$–$C_9$ α,β-unsaturated monocarboxylic acid, and (c) 63–86 weight percent of a lower alkyl ester of a $C_3$–$C_9$ α,β-unsaturated monocarboxylic acid. The particular process of this invention comprises two stages (A and B) of polymerization. Stage A involves polymerizing to greater than 40% conversion, an initial diene rich monomer charge which contains about 35–100 weight percent of the total weight of monomer (a) to be used in preparing interpolymer (I). The composition of the initial monomer charge consists essentially of 30–80 weight percent monomer (a) and 20–70 weight percent of a mixture of monomers (b) and (c), the ratio of (b) to (c) in the initial monomer charge deviating less than 40% from the ratio of (b) to (c) in the interpolymer (I) being prepared. Stage B involves adding to the reaction product mixture of stage A, and polymerizing therewith, a second monomer charge consisting essentially of the remaining monomeric compounds of the particular interpolymer (I) being prepared, the rate of addition in stage B being such that the presence of unreacted monomer is less than about 30 weight percent based on the total weight of interpolymer (I) being prepared.

Many of the floor polish compositions disclosed in U.S. Patent 3,406,133 which have the interpolymer component formulated according to the above process exhibit greatly improved removability characteristics. It has been discovered that a polish, so formulated, can be readily removed from common floor surfaces (i.e., linoleum, asphalt tile, vinyl, vinyl asbestos, stone, terrazo, rubber tile, wood, etc.) by the simple application of conventional cleansers such as household detergents, "Spic & Span," "Soilax," and common household ammonia. Additionally, this easy removability is not achieved at the sacrifice of the other desirable characteristics disclosed in the aforementioned application. Thus, in addition to easy removability, a polish composition is provided that possesses high gloss, hardness, excellent resistance to mars and scuffs and does not yellow on aging.

The preferred conjugated dienes for use as monomer (a) are 1,3-butadiene, isoprene, and chloroprene. However, other useful conjugated dienes are 2,3-dichloro-1,3-butadiene, fluoroprene, 2,3-difluoro-1,3-butadiene, 2,3-dimethyl - 1,3-butadiene, 1,3-butadienes with lower alkyl groups substituted on one or both of the 2,3-carbon atoms. Mixtures of conjugated dienes can also be used. As used in this invention the term lower alkyl group refers to alkyl groups containing less than about seven carbon atoms (i.e., about 1–6 carbon atoms). The lower alkyl groups can be the straight chain alkyl groups, such as methyl, ethyl, propyl, butyl, pentyl, hexyl or branched isomers thereof (e.g., isopropyl, isobutyl, sec. butyl, tert. butyl, neopentyl, etc.).

Preferred α,β-unsaturated monocarboxylic acids useful as monomer (b) are acrylic acid and methacrylic acid. Additional useful acids are those having the structures

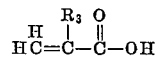

wherein $R_3$ is a lower alkyl group. Such acids as ethyl acrylic acid, propyl acrylic acid, butyl acrylic acid, etc. and mixtures of any of these acids can be used.

Lower alkyl esters useful as monomer (c) in preparing interpolymer (I) can be formed from any of the carboxylic acids set forth in the previous paragraph. Such useful esters have the structure

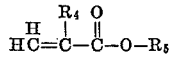

where $R_4$ is hydrogen or a lower alkyl group and $R_5$ is a lower alkyl group. Mixtures of these esters can also be used. The acid component of the ester is not dependent upon the carboxylic acid used in the interpolymer; thus, methylmethacrylate can be the lower alkyl ester while acrylic acid is the α,β-unsaturated carboxylic acid. The lower alkyl methacrylates and lower alkyl acrylates, such as methyl acrylate, methylmethacrylate, ethyl acrylate, ethyl methacrylate, etc., are especially preferred esters.

Though interpolymer (I) is prepared from the above monomers, namely, (a) a conjugated diene, (b) an α,β-unsaturated monocarboxylic acid, and (c) a lower alkyl ester, a monoethylenically unsaturated monomer free from acidic groups can replace up to fifty percent of the lower alkyl ester (c). Thus, it is to be understood that the monomeric composition (c), usually referred to as the ester composition, can contain up to fifty percent by weight of compounds, such as acrylonitrile, styrene, substituted styrenes, vinyl ethers, vinyl alcohols, vinyl esters, vinyl dioxolanes, vinyl chlorides, ethylenes, and lower alkyl derivatives of these compounds.

One of the essential requirements of the process of this invention is the initial polymerization of a monomer charge rich in the conjugated diene component (i.e.: "diene rich," meaning that the weight percentage of conjugated diene in the initial monomer charge is at least twice as large as that in the interpolymer (I) being prepared). While all of the conjugated diene monomer used in preparing the interpolymer (I) can be included in the initial monomer charge it has been found preferable to include only between 55 and 80 weight percent of the total diene monomer to be polymerized.

Similarly, the initial monomer charge can consist solely of conjugated diene monomer. However, preferably the diene concentration in the initial monomer composition is between 30 and 75 weight percent with the remainder of the initial monomer composition being the acid and ester monomers. The ratio of the amount of acid to ester monomer in the initial monomer charge preferably conforms to that in the final interpolymer (I) being prepared though a 40% deviation from the final interpolymer ratio can be tolerated without substantially detracting from the removability properties of the resultant floor polish. Thus, when interpolymer (I) is prepared from 5 parts acid and 80 parts ester the ratio of their amounts is $5/80=.0625$ and the ratio of their amounts in the initial monomer charge can be between .0375 and .0875.

It is apparent that the concentration limits and the total amount of initial monomer charge can be completely described by two parameters. The first of these is the proportion of conjugated diene in the initial monomer charge (IMC), based on the total amount of diene used in forming the interpolymer (I), and the second is the weight percentage of conjugated diene in the initial monomer charge (IMC). Table 1 presents values of the above two parameters that are the most useful in preparing interpolymers with different conjugated diene monomers. Also presented in this table are the most useful overall interpolymer (I) compositions for various conjugated dienes. All values in this table are on a weight percentage basis.

TABLE 1

| | Weight proportion in interpolymer (I) | Percent of diene in (IMC) based on total diene used in preparing interpolymer (I) | Weight percent diene in (IMC) |
|---|---|---|---|
| Butadiene base: | | | |
| 1,3-butadiene | 11–20 | | |
| Methacrylic acid | 3–7 | 65–75 | 33–60 |
| Methylmethacrylate | 73–86 | | |
| Chloroprene base: | | | |
| Chloroprene | 17–30 | | |
| Methacrylic acid | 3–7 | 70–80 | 40–70 |
| Methylmethacrylate | 63–80 | | |
| Isoprene base: | | | |
| Isoprene | 13–25 | | |
| Methacylic acid | 3–7 | 68–78 | 35–65 |
| Methylmethacrylate | 68–84 | | |

The polymerization of the initial monomer mixture (stage A) is carried out in an aqueous emulsion using conventional dispersants and polymerization catalysts and initiators. The effectiveness of the process is not limited to particular dispersants or catalysts and reference is made to United States patent application Ser. No. 196,612, filed May 22, 1962, now U.S. Patent 3,206,241, for useful species of these ingredients. Similarly, while batchwise polymerization is preferred, a process involving continuous monomer addition can also be employed.

The stage A polymerization must proceed to greater than 40% conversion before addition of the remaining monomers and stage B polymeriaztion is begun. While for ease of removability it is preferred that the initial monomer mixture be substantially completely polymerized before starting stage B of the process, the decreased rate of polymerization after about 70%–75% conversion makes attainment of higher conversions during stage A impracticable. Thus, the stage B polymerization is preferably commenced after about 70% conversion in stage A.

For the purpose of this invention the percent conversion is determined by a heat of polymerization method. For a given interpolymer compostion this method involves the following steps:

(1) calculating the heat of polymerization in forming the interpolymer using the literature values of specific heats of homopolymerization for the individual monomers;

(2) Experimentally measuring the actual heat of polymerization using the process of this invention;

(3) Obtaining the actual specific heat of polyerization for each monomer by multiplying the literature value of the specific heat of homopolymerization by the ratio of the measured heat of polymerization to the calculated heat of polymerization (i.e., step (2)/step (1));

(4) Calculating the heat of polymerization for 100 percent conversion in stage A of the polymerization process using the values of the individual specific heats of polymerization obtained in step (3);

(5) Experimentally measuring the actual heat of polymerization in stage A;

(6) Computing the percent conversion for stage A by multiplying the ratio of the measured heat of polymerization in stage A to the calculated value by 100 [i.e., step (5)/step (4)×100].

Another important characteristic of the process of this invention is the necessity for substantially continuous polymerization during stage B. This polymerization is conveniently carried out by adding continuously to the vessel containing the polymer reaction product of stage A the monomers for the stage B polymerization. The rate of addition in this step is controlled such that the unreacted monomer content of the vessel preferably does not exceed 30 weight percent based on the total monomers to be polymerized. In describing this step the phrase continuous addition does not mean that the addition must be uniform, though this is preferred. The important aspect of this step is maintaining the unreacted monomer in the reaction vessel below 30 weight percent, particularly when the conversion of the initial monomer charge is 80% or less. The 30 weight percent value is less important when the initial monomer conversion is higher.

As set forth in U.S. Patent 3,406,133 the overall appearance of the floor polish depends on the average particle size of the polymer in the interpolymer latex. Generally, to avoid a milky appearance and a rough surface the average particle size, all particles being considered practically spherically, must not exeed two-tenths of a micron in diameter and preferably is less than one-tenth. While for the sole purpose of polish removability the particle size does not have the above limitation, the particle size of the interpolymer formed by the process of this invention can have the desired particle size by suitable agitation of the reaction vessel during polymerization. Example I presents a preferred method of practicing the process of this invention.

EXAMPLE I 216.5 lbs. deionized water and 25.6 lbs. "Duponol WAQE"[1] (30% solids) are charged into a nitrogen purged closed reactor having an agitator and the reactor evacuated to 22″ Hg vacuum. Agitation of the reactor is begun and continued for the duration of the process. An initial monomer charge of 30 lbs. 1,3-butadiene, 28.24 lbs. methyl methacrylate, and 1.76 lbs. methacrylic acid is added to the reactor and the total charge heated to 62° C. and about 55 p.s.i.g. at which time 60.7 lbs. of ammonium persulfate solution[2] and 7.45 lbs. sodium meta bisulfite solution[3] are added thus cooling the charge to 57° C. and 50 p.s.i.g.

Polymerization is observed to begin almost immediately as shown by an exothermic temperature rise, and by means of external cooling the reactor temperature is controlled to rise over a 35-minute period to 70–72° C. During this time the pressure increases to a maximum of about 57–60 p.s.i.g. and then decreases rapidly to about 40 p.s.i.g. by the time the temperature has risen to 70° C.

After about 45 minutes from initiation, the polymerization rate diminishes indicating the approaching termination of stage A and the addition of the second monomer charge is commenced for stage B polymerization. The second monomer charge is continuously and uniformly added over a 100 minute period. During this time the reaction vessel temperature rises to about 80° C. where it is held for the remainder of the process while the pressure continuously decreases during the addition to about 3 p.s.i.g. An ammonium persulfate solution[4] is added concurrent with this continuous final monomer addition.

After the complete addition of the second monomer charge an ammonium persulfate solution[5] is added and the reaction is held at 80° C. and about 3 p.s.i.g. for 10 minutes and then cooled to 50° C. An ammonia solution[6] is then added and the reaction product mixture, which is in the form of a latex, is cooled to 35°–40° C. and filtered through a 100 mesh screen.

Table II summarizes data of the Example I process and certain characteristics of the formulated interpolymer latex.

TABLE II

Process data

Interpolymer composition:
   1,3-butadiene _____wt. percent__ 15
   Methylmethacrylate _____do____ 80
   Methacrylic acid _____do____ 5
Final monomer charge:
   1,3-butadiene _____do____ 6.3
   Methylmethacrylate _____do____ 88.2
   Methacrylate acid _____do____ 5.5
Initial monomer charge:
   1,3-butadiene _____do____ 50
   Methylmethacrylate _____do____ 47
   Methacrylate acid _____do____ 3
Percent of 1,3-butadiene in initial monomer charge
  (based on total amount of 1,3-butadiene monomer
  used in forming (I)) _____ 66.6

---
[1] Registered trademark of E. I. du Pont de Nemours and Company and described as being the sodium salt of technical lauryl alcohol sulfate.
[2] 1.95 lbs. ammonium persulfate, 1.96 lbs. "Duponol WAQE," 56.8 lbs. deionized water.
[3] 0.45 lb. sodium metabisulfite, 7.0 lbs. deionized water.
[4] 1.12 lbs. ammonium persulfate, 1.12 lbs. "Duponal WAQE," 32.5 lbs. deionized water.
[5] 0.28 lbs. ammonium persulfate, 0.28 lb. "Duponol WAQE," 8.12 lbs. deionized water.
[6] 10.23 lbs. conc. ammonia, 0.28 lb. "Duponol WAQE," 10.23 lbs. deionized water.

Percent conversion of initial monomer charge=72%.
Maximum unreacted monomer after continuous addition started=15%.

Latex properties

Latex viscosity, cps. _____ 10–20
Latex, percent solids _____ 34–36
Average latex particle size, microns _____ .04–.08
Percent monomer conversion _____ 99–100

As indicated in Example I it is usually desirable after the two stages of polymerization are completed, to stabilize the latex by adding an ammonia solution and subsequently filtering the latex. The formulation of the floor polish itself is described in U.S. Patent 3,406,133. This usually involves diluting the interpolymer latex to a convenient solids level and simply combining it with waxes, leveling resins, and other desirable floor polish ingredients. Example II presents conventional polish components which are simply cold blended to form a floor polish composition.

EXAMPLE II

Dispersion or solution (parts by wt.)

Interpolymer latex (aqueous emulsion, 18% solids):
  15% 1,3-butadiene, 5% methacrylic acid, 80% methylmethacrylate _____ 70
Levelling resin: "Shanco L–1177" (aqueous ammonia, 18% resin) _____ 15
Wax: "PolyEM–10" (emulsion polymerized, 18% solids) _____ 15
"Carbitol" solvent _____ 2
Plasticizer (tributoxyethyl phosphate) _____ 0.5

The method used for testing the removability of the floor polish is similar to that described in ASTM D1792–60T. The method used involves an initial application and aging step which encompasses the following sequential procedure:

(1) Polish applied as a coating to Official Test-Linoleum and Official Test-Rubber panels in an amount of 0.2 ml./8 sq. in.
(2) Coated panels air dried for one hour.
(3) Coated panels aged for 18–24 hours at 52° C.

Subsequently, the polish is removed from the panels using a Gardner straight line washability machine which is obtainable from Gardner Laboratory, Inc., of Bethesda, Md. This machine operates by scrubbing, in a stroke fashion, the coated panel with a hog bristle brush soaked with a standard soap solution. The standard soap solution is a 2 percent aqueous potassium soap solution prepared by dissolving 3.5 g. of commercial-grade potassium hydroxide (KOH, 90 percent) and 16.5 g. oleic acid in 1000 ml. of distilled water containing 5 ml. of ammonium hydroxide ($NH_4OH$, 28 percent). The ease of a polish's removability is determined as a function of the amount of polish removed after 150 brush strokes corresponding to 75 machine cycles. The amount of polish removed is determined by visual estimation of the percent of test area that is free of polish after 150 strokes. The following Table III presents a rating chart used to evaluate the removability of a particular polish.

TABLE III

| Percent of polish removed: | Removal ease |
|---|---|
| 90–100 | Excellent. |
| 70–90 | Very good. |
| 50–70 | Good. |
| 20–50 | Fair. |
| 0–20 | Poor. |

The previously described removability test is used to indicate the ease of removability of identical floor polish compositions applied in the same amount and manner and differing only in the method of terpolymer formulation.

Table IV below presents the results of these tests along with the particular formulation of the initial monomer charge for each sample. For samples 1–7 the polymerization of the initial monomer charge (stage A) is batchwise and, except for the monomer composition and amount, basically the same as given in Example 1. The stage B polymerization is accomplished by continuous addition of the final monomer charge. The rate of addition of the final monomer charge is the same for samples 1–7.

The terpolymer used in the polish of sample 8 is prepared by a batch method. The ingredients for the batch polymerization process are the same as Example 1 except that twice the amount of sodium metabisulfite activator is used. The initial charge consists of all the monomers to be polymerized and all of the other ingredients except that only 16.7 percent of the metabisulfite is initially added, the reminder being continuously added during polymerization. The polymerization is initiated by heating the charge to 50° C., 14 p.s.i.g., and except for a brief exothermic temperature rise to about 65° C. during the first hour of polymerization a temperature of 50° C. is maintained. The polymerization is complete to about 99% conversion in 1.5 hours.

The overall monomer composition for each of the samples is the same, namely, 15 parts 1,3-butadiene, 80 parts methylmethacrylate, and 5 parts methacrylic acid. Additionally, each polish composition is that as given in Example II and all are similarly formulated in accordance with that example. Thus, the differences in removability indicated in Table IV is a function of the particular polymerization process.

TABLE IV

| Sample | Initial monomer charge (IMC) | | Polish film removability |
|---|---|---|---|
| | Weight percent butadiene in (IMC)[1] | Weight percent of total butadiene monomer in (IMC) | |
| 1 (invention process) | 33.3 | 72 | Very good. |
| 2 (invention process) | 50.0 | 66.6 | Excellent. |
| 3 (invention process) | 58.7 | 68 | Do. |
| 4 (comparative) | 15 | 7.5 | Poor. |
| 5 (comparative) | 15 | 28.8 | Do. |
| 6 (comparative) | [2] 0 | 0 | Do. |
| 7 (comparative) | 5 | 9.1 | Do. |
| 8 (comparative) | 15 | 100 | Do. |

[1] For all samples the remainder of initial monomer charge is made up of methacrylic acid and methylmethacrylate in 5/80 weight ratio, respectively.

[2] (IMC) is 29.5 parts of a mixture of methacrylic acid and methylmethacrylate in 5/80 weight ratio, respectively.

The results in Table IV set worth the advantage in using the process of this invention. The polymerization process of samples 1–3 are within the scope of this invention and the resultant polishes exhibit very good to excellent removability properties. In particular, sample 2 which corresponds to the polymerization process of Example I shows excellent polish film removability. On the other hand the polishes of samples 4–7 are deficient in removability. The interpolymer in the floor polishes of these latter samples are outside the scope of this invention with respect to both parameters listed in Table IV. Thus, in samples 4–7 both the weight percent butadiene in the initial monomer charge and the weight percent of total butadiene in the initial charge are below the operable limits in this invention of 30 and 35, respectively.

Additionally, the results in Table IV point out the deficiency of a one-step batchwise polymerization process. Sample 8, exemplary of a polish containing a terpolymer prepared by a one-step process, shows poor removability in contrast with the excellent results demonstrated by those polishes prepared in accordance with this invention.

It has also been discovered that the polishes as represented by samples 1–3 have all the other desirable aforementioned floor polish properties. In this respect yellowness index, flexibility, and heel mark resistance tests were conducted on these samples following the procedures set forth in U.S. Patent 3,406,133. The results indicated superior performance. Thus, formulating the polish interpolymers according to the process of this invention does not detract from the improved properties derived from using the particular interpolymers of U.S. Patent 3,406,-133.

What is claimed is:
1. A process for preparing an interpolymer (I) consisting essentially of about 11–30 weight percent monomeric units of (a) a conjugated diene of the formula

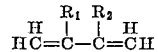

wherein $R_1$ and $R_2$ are individually hydrogen, chlorine, fluorine or lower alkyl groups, 3–7 weight percent of units of (b) a $C_3$–$C_9$, $\alpha,\beta$-unsaturated monocarboxylic acid, and 63–86 weight percent of units of (c) a monomeric composition consisting essentially of at least 50 percent of units of a lower alkyl ester of a $C_3$–$C_9$ $\alpha,\beta$-unsaturated monocarboxylic acid, with the remaining units of said monomeric composition (c) consisting essentially of a monoethylenically unsaturated monomer free from acidic groups; said process comprising two stages in which polymerization is carried out in an aqueous emulsion:
   (1) stage A consisting essentially of polymerizing to greater than 40% conversion an initial diene rich monomer charge which contains from 35 to 100 weight percent of the total amount of monomer (a) used in preparing interpolymer (I) and the composition of said monomer charge containing 30 to 80 weight percent monomer (a) and 20 to 70 weight percent of a mixture of (b) and (c), the ratio of (b) to (c) in said mixture deviating less than 40% from the ratio of (b) to (c) used in preparing the interpolymer (I), and
   (2) stage B wherein a mixture of the remaining monomers to be polymerized is continuously added to the reaction product mixture produced in stage A and polymerized therewith, the rate of addition of said mixture of remaining monomers being such that the presence of unreacted monomers is less than about 30 weight percent based on the total weight of interpolymer (I).

2. The process of claim 1 wherein (a) is 1,3-butadiene, chloroprene or isoprene, (b) is acrylic acid or methacrylic acid, and (c) is a lower alkyl acrylate or a lower alkyl methacrylate.

3. The process of claim 2 wherein (b) is methacrylic acid and (c) is methylmethacrylate.

4. The process of claim 3 wherein (a) is 1,3-butadiene.

5. The process of claim 1 wherein the initial diene rich monomer charge contains from 55 to 80 weight percent of the total amount of monomer (a) used in preparing interpolymer (I) and the composition of which consists essentially of 30–75 weight percent (a) and 25–70 weight percent of a mixture of (b) and (c), the ratio of (b) to (c) in said mixture being substantially the same as that in the interpolymer (I) being prepared.

6. The process of claim 5 wherein the stage A polymerization proceeds to greater than 70% conversion before commencing stage B.

7. The process of claim 6 wherein (a) is 1,3-butadiene, chloroprene, or isoprene, (b) is acrylic acid or methacrylic acid, and (c) is a lower alkyl acrylate or a lower alkyl methacrylate.

8. The process of claim 7 wherein (b) is methacrylic acid and (c) is methyl methacrylate.

9. The process of claim 8 wherein (a) is 1,3-butadiene.

10. A process for preparing an interpolymer (I) formed from monomeric units consisting essentially of (a) 15 weight percent 1,3-butadiene, (b) 5 weight percent methacrylic acid, and (c) 80 weight percent methyl methacrylate comprising two stages in which polymerization is carried out in an aqueous emulsion:
   (1) stage A consisting essentially of polymerizing to greater than 70% conversion an initial diene rich monomer charge which contains about two-thirds of the total amount of monomer (a) used in preparing interpolymer (I) and the composition of which consists essentially of 50 weight percent (a), 3 weight percent (b) and 47 weight percent (c), and (2) stage B wherein a mixture of the remaining monomers to be polymerized is continuously added to the reaction product mixture produced in stage A and polymerized therewith, the rate of addition of said mixture of remaining monomers being such that the presence of unreacted monomer never exceeds 15 weight percent based on the total weight of interpolymer (I).

11. The process of claim 10 wherein the average particle size of the prepared interpolymer (I) is less than one-tenth micron in diameter.

References Cited

UNITED STATES PATENTS

| | | | |
|---|---|---|---|
| 3,202,627 | 8/1965 | Van Ess et al. | 260—880 XR |
| 3,223,655 | 12/1965 | Murdock | 260—879 XR |
| 3,296,175 | 1/1967 | Fantl et al. | 260—29.7 XR |

MURRAY TILLMAN, Primary Examiner

M. J. TULLY, Assistant Examiner

U.S. Cl. X.R.

117—161; 260—29.7, 80.7, 880